United States Patent [19]
Peters et al.

[11] Patent Number: 6,164,529
[45] Date of Patent: *Dec. 26, 2000

[54] SELF SERVICE TERMINAL

[75] Inventors: Kenneth J. Peters, Dundee; Steven A. Carnegie, Blairgowrie, both of United Kingdom

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,342

[22] Filed: Jul. 16, 1997

[30]     Foreign Application Priority Data

Dec. 24, 1996 [GB] United Kingdom .................. 9626834

[51] Int. Cl.$^7$ .................................................. G06F 17/60
[52] U.S. Cl. ............................................. 235/379; 705/41
[58] Field of Search ...................... 235/375, 379, 235/380, 487, 492, 381; 705/41, 42, 43, 44

[56]                References Cited

U.S. PATENT DOCUMENTS

| | | |
|---|---|---|
| 4,689,478 | 8/1987 | Hale et al. .............................. 235/380 |
| 4,748,557 | 5/1988 | Tamada et al. ......................... 364/200 |
| 4,804,825 | 2/1989 | Bitoh . |
| 4,859,837 | 8/1989 | Halpern .................................. 235/380 |
| 4,983,816 | 1/1991 | Iijima ..................................... 235/379 |
| 5,563,393 | 10/1996 | Coutts .................................... 235/379 |
| 5,705,798 | 1/1998 | Tarbox ................................... 235/379 |
| 5,714,741 | 2/1998 | Pieterse et al. ........................ 235/380 |
| 5,777,304 | 7/1998 | Awatsu et al. ......................... 235/379 |
| 5,780,825 | 7/1998 | Sato et al. .............................. 235/379 |
| 5,861,614 | 1/1999 | Gardner ................................. 235/379 |

FOREIGN PATENT DOCUMENTS

| | | |
|---|---|---|
| 0114368 | 8/1984 | European Pat. Off. . |
| 0168836 | 1/1986 | European Pat. Off. . |
| 0182244 | 5/1986 | European Pat. Off. . |
| 0214653 | 3/1987 | European Pat. Off. . |
| 0363122 | 4/1990 | European Pat. Off. . |
| 0653717 | 5/1995 | European Pat. Off. . |
| 0658862 | 6/1995 | European Pat. Off. . |
| 3619566 | 12/1987 | Germany . |

*Primary Examiner*—Thien M. Le
*Attorney, Agent, or Firm*—Gregory A. Welte

[57]                ABSTRACT

An automated teller machine (ATM) 10 is provided with a reader/writer 28 for a flex disc 34. The ATM can be operated to download a receipt or a ministatement to a flex disc inserted by a cardholder, and the information can be encrypted or compressed. The flex disc can be preloaded with an instruction by a home PC, and the instruction can be encrypted.

18 Claims, 3 Drawing Sheets

SELF SERVICE TERMINAL

BACKGROUND OF THE INVENTION

This invention relates to a self service terminal for use in the financial field, for example an automated teller machine (ATM).

It is known for ATMs to provide a receipt for a transaction or a mini statement or to update a user's passbook; receipts and statements are provided as printed paper records, and the printing mechanism requires a considerable volume of space within the ATM. Also, provision of paper records may lead to a litter problem in the area of the ATM.

It is also known to provide on disc programs such as computer spreadsheets and home banking services; the latter may include the use of data encryption for security.

SUMMARY OF THE INVENTION

It is an object of the invention to provide a self service financial terminal providing enhanced services.

According to the invention there is provided a self service financial terminal comprising a processor, characterized by further compromising a reader/writer for a portable digital storage device. Preferably the terminal also comprises a card reader and cash delivery means.

Also according to the invention a method of operating a self service financial terminal, said terminal comprising a processor, and a reader/writer for a portable digital storage device characterized by the steps of:

receiving a portable digital storage device in said reader/writer;

receiving an instruction;

and writing data to the portable digital storage device.

Preferably said terminal further comprises a card reader, and delivery means, and the method is characterized by the step of receiving a data bearing card in the card reader and validating the card. Data written to the storage device is then data relevant to that card.

BRIEF DESCRIPTION OF THE DRAWINGS

The invention will now be described by way of example only with reference to the accompanying drawings in which.

DETAILED DESCRIPTION

Figure 1:
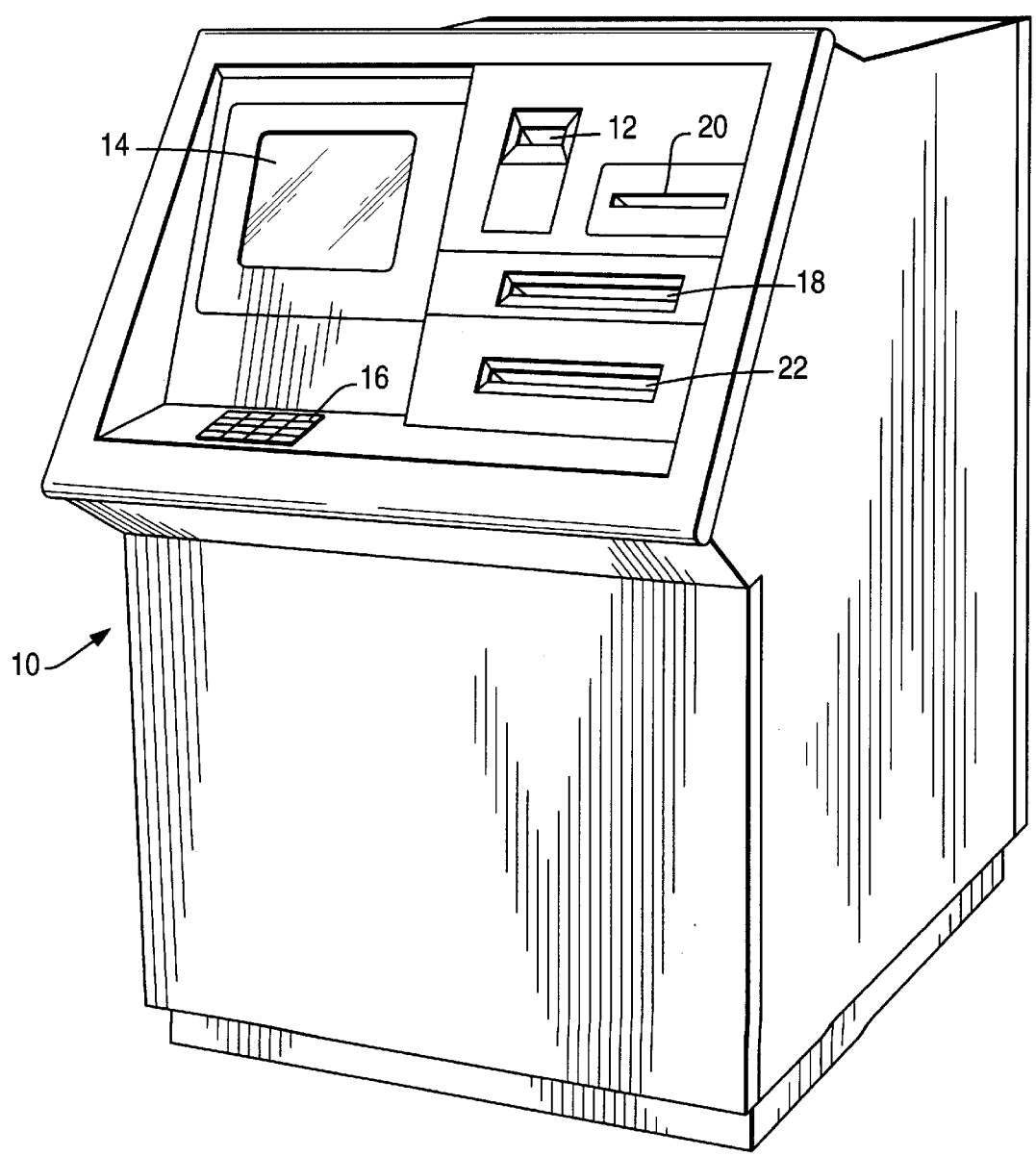
FIG. 1 is a view of an ATM according to the invention.

In FIG. 1 an ATM 10 is provided with a user card input slot 12, a display screen 14, a keypad 16, a banknote delivery slot 18, and a mini statement delivery slot 20, as is conventional. The ATM also has an input slot 22 for a flex disc, backed by a security shutter (not shown).

Figure 2:
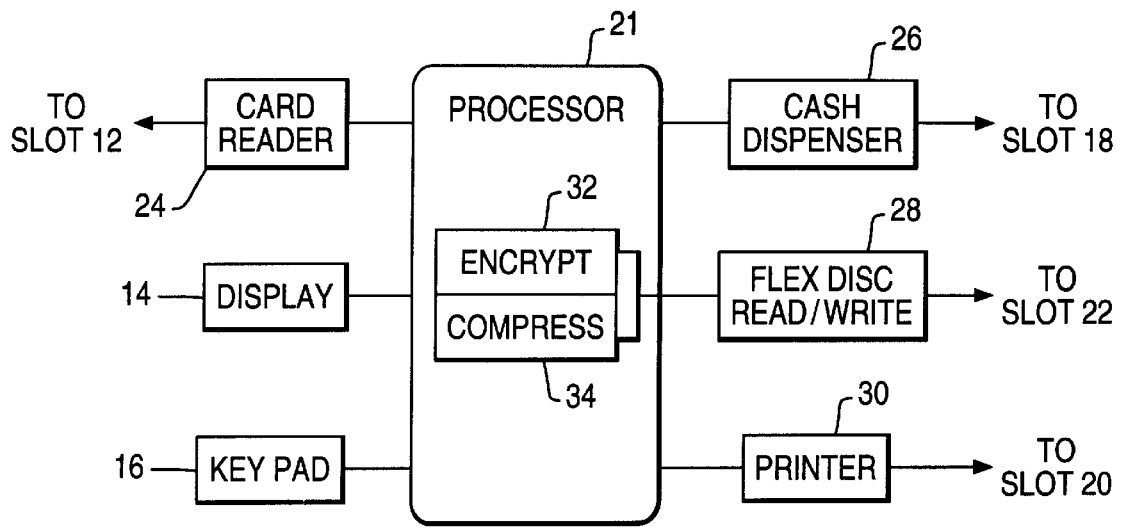
FIG. 2 is a schematic diagram of the control system of the ATM.

FIG. 2 indicates that the ATM is controlled by a processor 21 connected to a card reader 24, to the display 14 and keypad 16, to a cash dispense device 26, and to a printer 30, as is conventional. The processor is also connected to a flex disc reader/writer 28, located adjacent to the flex disc input slot 22. The connection between the processor 21 and the flex disc reader/writer 28 is through an encryption module 32.

The processor 21 operates to control the ATM 10 in the conventional manner; a user inserts a card through the slot 12 into the card reader 24 and enters a personal identification number (PIN) on the keypad 16. If the card is valid, the user requests a sum of cash which is provided by the cash dispense device 26 through the slot 18. The printer 30 prints a receipt for the transaction for delivery through the slot 20. A mini statement can also be requested, and will be printed by the printer and issued through the slot 20.

Similar services can be provided in an enhanced manner by the use of the flex disc reader writer 28. In the simplest case, the user inserts a user card and enters a PIN and cash request as before, and also inserts a flex disc in the reader/writer 28. The currency is provided as before, but the receipt is written to the flex disc, which is then withdrawn by the user; the disc can be used on a home computer in association with a spreadsheet of the users bank account. Similarly, a mini statement can be written to the disc, the result is the electronic equivalent of updating a passbook.

In a variation, the conventional printer 30 is no longer provided, with a considerable space saving in the ATM, and with elimination of a litter risk from ATM printed media.

Since flex discs are portable and insecure, data on the disc may be password protected, and also encrypted by the encrypt module 32; the user then requires compatible decryption software for use on the home PC. In an alternative arrangement, data written to the disc may be compressed in compress module 34, thus reducing the write/verify time, which is especially advantageous when large files are being written.

In addition, the user may initially write to the flex disc the required transaction in encrypted form, using for example a home personal computer, and then inserts the flex disc in the ATM and enters only the user's PIN; the transaction is run by the ATM using the information from the flex disc rather than from keypad input.

In a further variation, the ATM may be provided with a cash and/or cheque deposit facility, and automatic processing means; the deposit details are then written to the flex disc.

Figure 3:
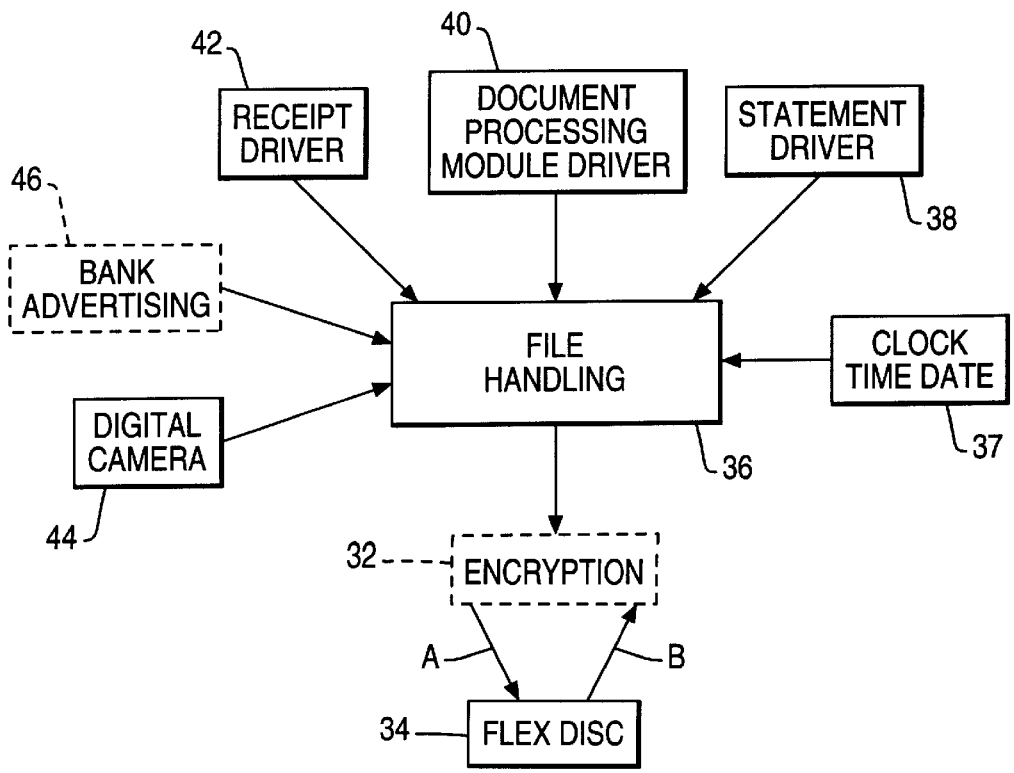
FIG. 3 indicates a downloading operation of the ATM to the flex disc.

FIG. 3 shows how the ATM 10 downloads various items to the flex disc 34 through the encryption module 32. Items are routed through a file handling module 36. The flex disc 34 can be provided with the time and date of a transaction from a clock 37; with the statement details from a statement driver 38; the receipt details for the current transaction, e.g. withdrawal of cash, transfer of funds, deposit of cash, deposit of cheques, or a mini statement, from a receipt driver 42; and a digital image of a scanned document such as a cheque or a bill payment form from the document processing module 40. A digital camera 44 provides an image of whatever is within its view, usually the face of the person inserting the disc, as a security check, and an image of deposited cheques.

Optionally, advertisements for banking services can be provided by a bank advertising module 46.

All of the above items of information are written to the disc 34 by the arrowed path A. The arrowed path B in the reverse direction allows the provision of the option of the user verifying the information written to the disc.

The encryption module 32 may also be provided with the option of prompting the user to provide a password via the key pad 16 either as a 'direct' numerical password or as an alpha-numeric password by using the keypad 16 as a selection pointer to alphanumeric characters on the monitor 14.

Figure 4:
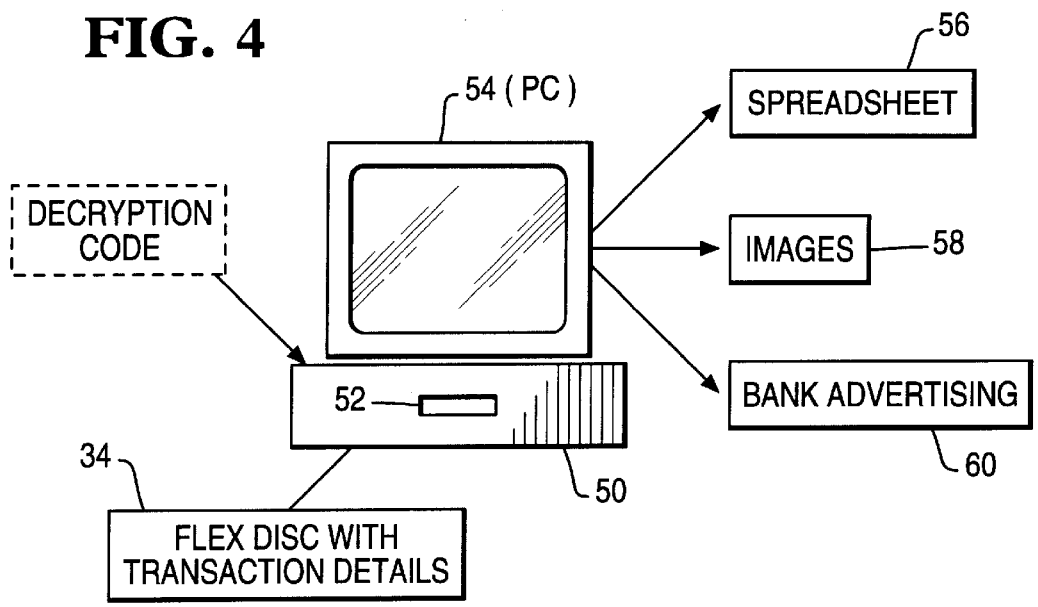
FIG. 4 shows use of the downloaded flex disc in a home computer.

FIG. 4 indicates use of the flex disc in a home banking PC 50; the disc carrying data which has been downloaded by the ATM is inserted in the disc slot 52; and PC 50 applies a decryption code. If a password was used at the time of writing the data to the flex disc, the user will be promoted to supply it. If the data was compressed, a decompression will be applied. The screen 54 can then display a spreadsheet 56 of the users bank statement, the digital image 58 of the user, and images of deposited cheques or bank advertising 60.

Figure 5:
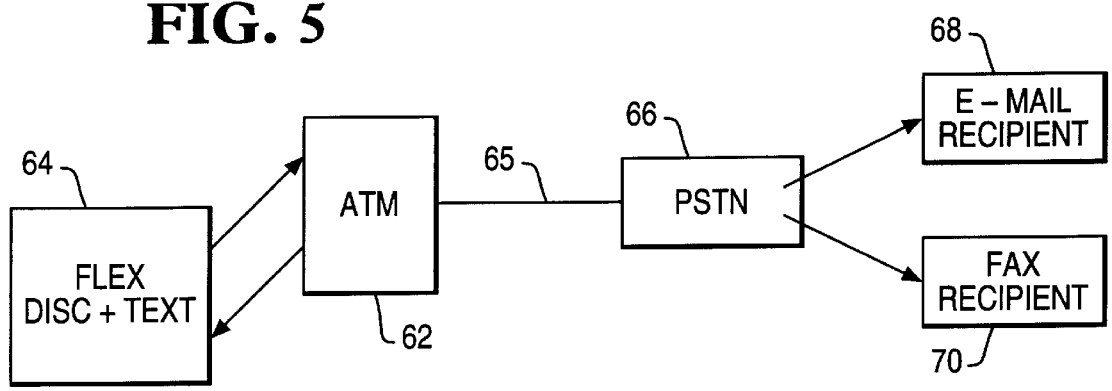
FIG. 5 shows use of the flex disc for e-mail or facsimile services.

In FIG. 5, a modified ATM 62 is provided with a slot for a flex disc 64, and also with a connection 65 to the public switched telephone network (PSTN) 66. The disc 64 can be pre-programmed with a message to be sent over the PSTN 66 by e-mail or fax to respective recipients 68,70.

Figure 6:
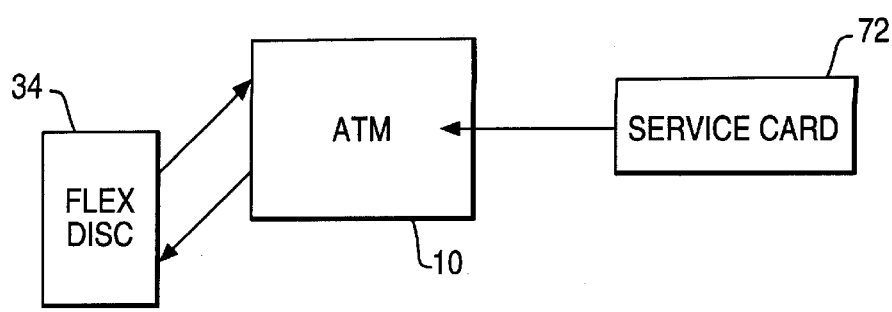
FIG. 6 shows a diagnostic download.

FIG. 6 shows a modification of the ATM 10 of FIGS. 1, 2 and 3. A flex disc 34 is inserted in the flex disc reader/writer 28, and a service card 72 is inserted in the card reader 24 by a service engineer or other authorized person. The ATM 10 is then operated to write a tally dump to the flex disc 34, or other data related to operation of the ATM. This has the advantage that the information can be acquired without taking the ATM temporarily out of service. Tally data is potentially sensitive, and to provide further security the disc format is arranged to be of a predetermined nature specific to the bank branch. The ATM is then arranged to check for the format during the tally dump selection process, and to abort the tally dump if the disc does not conform.

In a further variation a self service terminal is provided having a flex disc reader/writer but which does not incorporate a card reader. A financial institution running the terminal may then permit its advertising information, e.g. about loans, to be downloaded to a flex disc inserted by anyone, and not only by customers holding an authorization card.

What is claimed is:

1. A self service financial terminal for enabling a user to carry out a transaction, the self service financial terminal comprising:

a reader/writer for receiving a portable digital storage device comprising a floppy diskette from the user;

a processor for controlling the reader/writer; and a currency dispenser for delivering currency to the user.

2. A self-service terminal according to claim 1, further comprising (i) a card reader for reading data on a data bearing card from the user, and (ii) cash delivery means for dispensing cash to the user.

3. A self-service terminal according to claim 2, wherein the processor includes an encryption module for encrypting data written to the portable digital storage device.

4. A self-service terminal according to claim 3, further comprising a file handler connected to the encryption module and for receiving inputs from at least one of a real-time clock, a statement driver, a document processing module driver, a receipt driver, a digital camera, and a source of advertising material.

5. A self-service terminal according to claim 1, wherein the processor includes a compression module for compressing data written to the portable digital storage device.

6. A self-service terminal according to claim 1, further comprising connection means for connection to a public switched telephone network.

7. A method of operating a self-service financial terminal including a reader/writer for a portable digital storage device comprising a floppy diskette, the method comprising the steps of:

(a) receiving a portable digital storage device comprising a floppy diskette in the reader/writer from a user carrying out a transaction at the self-service financial terminal;

(b) writing data to the portable digital storage device in response to receiving an instruction in the reader/writer to write data to the portable digital storage device; and (c) dispensing currency to at least some users.

8. A method according to claim 7, further comprising the steps of:

(d) receiving a data bearing card in a card reader from the user;

(e) validating the data bearing card; and (f) writing to the portable digital storage device data relevant to the data bearing card.

9. A method according to claim 8, further comprising the step of:

(g) encrypting the relevant data before writing to the portable digital storage device.

10. A method according to claim 8, wherein the relevant data relates to the user's account.

11. A method according to claim 8, wherein the relevant data relates to the operation of the self-service financial terminal.

12. Terminal according to claim 1, wherein the transaction is of the financial type.

13. Method according to claim 7, wherein the transaction is of the financial type.

14. In an Automated Teller Machine (ATM), the improvement comprising:

a) a data writer for
      i) accepting a data storage medium, and
      ii) writing data to the medium;

b) means for ordering the data writer to selectively write one of the following to the data storage medium:
      i) customer data which relates to a transaction undertaken by a customer; or
      ii) diagnostic data which relates to operation of the ATM; and c) means for dispensing currency.

15. Improvement according to claim 14, and further comprising c) a card reader for accepting a service card which authorizes writing of the diagnostic data.

16. In an Automated Teller Machine of the type which includes a currency dispenser, the improvement comprising:

a) a floppy diskette drive, for receiving a floppy diskette from a customer engaging in a financial transaction; and b) means for writing data related to the transaction to the floppy diskette.

17. Improvement according to claim 16, wherein the data includes a scanned document.

18. Improvement according to claim 16, wherein the data includes (i) time-of-day, (ii) date, and (iii) a cash amount.

* * * * *